United States Patent [19]
Kojoh et al.

[11] Patent Number: 5,962,615
[45] Date of Patent: *Oct. 5, 1999

[54] ETHYLENE POLYMER

[75] Inventors: Shin-ichi Kojoh; Mamoru Kioka, both of Yamaguchi, Japan

[73] Assignee: Mitsui Chemicals, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/597,472

[22] Filed: Feb. 2, 1996

Related U.S. Application Data

[63] Continuation of application No. 08/394,627, Feb. 27, 1995, abandoned.

[30] Foreign Application Priority Data

Mar. 2, 1994 [JP] Japan ..................................... 6-032178

[51] Int. Cl.$^6$ .................................................. C08F 10/02
[52] U.S. Cl. .................................... 526/348.2; 526/124.7; 526/153; 526/348.6; 526/352
[58] Field of Search ............................... 526/124.7, 352, 526/348.2, 348.6

[56] References Cited

U.S. PATENT DOCUMENTS

| | | | |
|---|---|---|---|
| 4,370,455 | 1/1983 | Ueda et al. | 526/125 |
| 4,370,458 | 1/1983 | Falke et al. | 526/138 |
| 4,410,672 | 10/1983 | Inazawa | 526/124 |
| 4,762,898 | 8/1988 | Matsuura et al. | 526/125 |
| 4,769,510 | 9/1988 | Kaminsky et al. | 585/512 |
| 4,987,212 | 1/1991 | Morterol et al. | 526/348.4 |
| 5,155,078 | 10/1992 | Kioka et al. | 502/110 |
| 5,180,702 | 1/1993 | Pettijohn | 502/107 |

FOREIGN PATENT DOCUMENTS

| | | |
|---|---|---|
| 0016707 | 10/1980 | European Pat. Off. . |
| 0102895 | 3/1984 | European Pat. Off. . |
| 0164215 | 12/1985 | European Pat. Off. . |
| 0452920 | 10/1991 | European Pat. Off. . |
| 0494084 | 7/1992 | European Pat. Off. . |
| 1800695 | 4/1969 | Germany . |
| 3443087 | 5/1986 | Germany . |
| 55-012735 | 1/1980 | Japan . |
| 57-158204 | 9/1982 | Japan . |
| 59-089341 | 5/1984 | Japan . |
| 59-164347 | 9/1984 | Japan . |
| 60-036546 | 2/1985 | Japan . |
| 60-106806 | 6/1985 | Japan . |
| 61-130314 | 6/1986 | Japan . |
| 4-218507 | 8/1992 | Japan . |
| 1233599 | 5/1971 | United Kingdom . |

OTHER PUBLICATIONS

"Control of Molecular–Weight Distribution in Polyolefins Synthesized with Ziegler–Natta Catalytic System", Zucchini et al., Advanced Polymre Science, vol. 51, Ind. Div., pp. 101–153, 1983.

*Primary Examiner*—David W. Wu
*Attorney, Agent, or Firm*—Birch, Stewart, Kolasch & Birch, LLP

[57] ABSTRACT

An ethylene polymer having small values of Mw/Mn and Mz/Mw, a small proportion of long-chain branches, a high melt tension and a high swell ratio produced by using a solid titanium catalyst component obtained by initially bring a solid titanium composition which is obtained by the contact of a solid magnesium aluminum composite containing magnesium, halogen, aluminum, and an alkoxy group of 6 or more carbon atoms and/or alcohol of 6 of more carbon atom with a tetravalent titanium compound into contact with an organometallic compound, and then bringing the resulting product into contact with oxygen. The ethylene polymer is excellent in moldability, and the molded article obtained therefrom is excellent in rigidity and impact resistance and free from poor appearance.

4 Claims, 1 Drawing Sheet

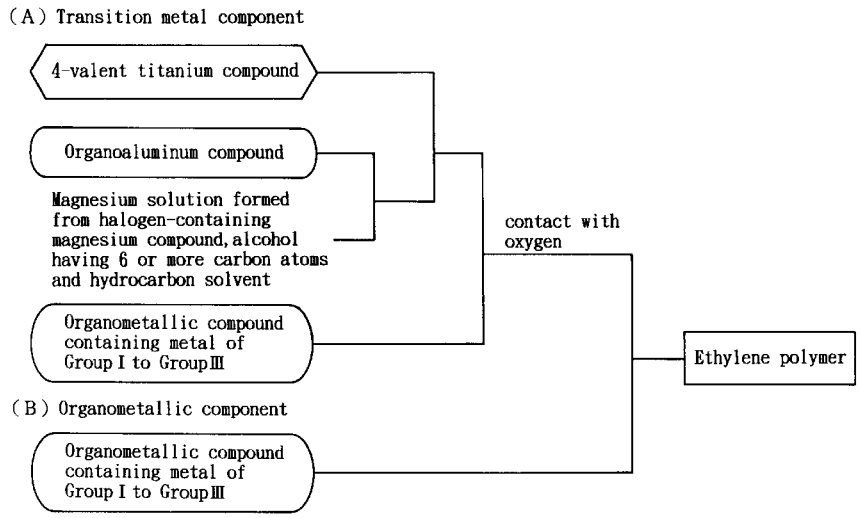

FIGURE

```
                                                    ┌─────────────────┐
                                                    │ Ethylene polymer│
                                                    └────────┬────────┘
                                                             │
                                                    contact with
                                                      oxygen
                             ┌───────────────────────────────┴─────────────────────────┐
                 ┌───────────┴───────────┐                                              │
        ┌────────┴────────┐              │                                              │
        │                 │              │                                              │
  ╭─────┴─────╮   ╭───────┴───────╮  ╭───┴────────────╮   ╭──────────────╮   ╭──────────┴──────────╮
  │ 4-valent  │   │Organoaluminum │  │Magnesium       │   │Organometallic│   │Organometallic       │
  │ titanium  │   │  compound     │  │solution formed │   │ compound     │   │ compound            │
  │ compound  │   │               │  │from halogen-   │   │containing    │   │containing metal of  │
  ╰───────────╯   ╰───────────────╯  │containing      │   │metal of      │   │Group I to Group III │
                                     │magnesium       │   │Group I to    │   ╰─────────────────────╯
                                     │compound, alcohol│  │Group III     │
                                     │having 6 or more │  ╰──────────────╯
                                     │carbon atoms     │
                                     │and hydrocarbon  │
                                     │solvent          │
                                     ╰─────────────────╯

(A) Transition metal component                            (B) Organometallic component
```

ETHYLENE POLYMER

This application is a continuation of application Ser. No. 08/394,627 filed on Feb. 27, 1995, now abandoned.

FIELD OF THE INVENTION

The present invention relates to an ethylene polymer, a solid titanium catalyst component for ethylene polymerization, an ethylene polymerization catalyst comprising the catalyst component and a process for preparing an ethylene polymer using the catalyst. More particularly, the invention relates to an ethylene polymer having a high melt tension, a high swell ratio, a narrow molecular weight distribution and a small proportion of long-chain branches, a solid titanium catalyst component for ethylene polymerization suitable for preparing the ethylene polymer, an ethylene polymerization catalyst comprising the catalyst component and a process for preparing an ethylene polymer using the catalyst.

BACKGROUND OF THE INVENTION

Ethylene polymers have heretofore been widely used as materials of hollow molded articles, extrusion molded articles, films and sheets. The properties required for such ethylene polymers vary depending on the use of the polymers and the molding method thereof. For example, in order to prevent vibration or the bursting of bubbles at the time of molding inflation films at high speed, or to prevent drawdown at the time of hollow molding or sheet forming, an ethylene polymer having a high melt tension must be used. Further, in order to produce bottles having a good shape of pinch-off scar or hollow molded articles having a narrow thickness distribution by hollow molding, an ethylene polymer having a high swell ratio must be used.

Ethylene polymers prepared by the use of Ziegler-Natta catalysts, such as $MgCl_2$-carrier support type Ti catalysts, are excellent in rigidity and impact resistance because almost no long-chain branch is present therein, but they are inferior in moldability to ethylene polymers prepared by the use of Cr type Phillips catalyst. On the other hand, the ethylene polymers prepared by a high-pressure method or prepared by the use of the Cr type Phillips catalysts have higher melt tension, higher swell ratio and more excellent moldability than the ethylene polymers prepared by the use of the Ziegler-Natta catalysts, but they deteriorate in rigidity and impact resistance due to the presence of the long-chain branches.

Under these circumstances, there have been made various studies on the ethylene polymers which are prepared by the use of Ziegler-Natta catalysts and are excellent in moldability and the like.

For example, Japanese Patent Laid-Open Publication No. 12735/1980 describes an ethylene polymer which is obtained by blending an ethylene polymer prepared by the use of Ziegler-Natta catalyst with an ethylene polymer prepared by means of a high-pressure method. Further, Japanese Patent Laid-Open Publication No. 36546/1985 describes an ethylene polymer which is obtained by blending an ethylene polymer prepared by the use of Ziegler-Natta catalyst with an ethylene polymer prepared by the use of Cr type Phillips catalyst. These ethylene polymers are improved in moldability, and however, the rigidity and impact strength inherent in the ethylene polymer prepared by the use of Ziegler-Natta catalyst are deteriorated because the proportion of the long-chain branches is increased.

Further, Japanese Patent Laid-Open Publication No. 89341/1984 describes an ethylene polymer which is obtained by modifying an ethylene polymer prepared by the use of Ziegler-Natta catalyst, in the presence a radical initiator; and Japanese Patent Laid-Open Publication No. 164347/1984 describes an ethylene polymer which is obtained by modifying an ethylene polymer prepared by the use of Ziegler-Natta catalyst, in the presence of maleic acid. Also in these cases, these ethylene polymers are improved in moldability, and however, the rigidity and impact strength thereof are deteriorated because the proportion of the long-chain branches is increased.

Furthermore, Japanese Patent Laid-Open Publications No. 158204/1982 and No. 106806/1985 describe ethylene polymers which are obtained by the use of a specific catalyst, have a small proportion of the long-chain branches and are excellent in the moldability. However, these ethylene polymers have large values of Mw/Mn and Mz/Mw and include a polymer having a molecular weight extremely larger than the average molecular weight. Such a polymer having a molecular weight extremely larger than the average molecular weight causes poor appearance of its molded article such as fish eye in many cases.

Still further, Japanese Patent Laid-Open Publication No. 130314/1986 describes an ethylene polymer excellent in moldability which is prepared by a multi-stage polymerization process. This ethylene polymer has a broad molecular weight distribution thereby to include an ethylene polymer having a molecular weight extremely larger than the average molecular weight, resulting in poor appearance of the molded article such as fish eye.

As described above, there has been earnest research on the ethylene polymers which are prepared by the use of Ziegler-Natta catalyst, are excellent in moldability and can be molded into articles excellent in mechanical strength and almost free from poor appearance, but any ethylene polymer having such properties was not found.

SUMMARY OF THE INVENTION

The present inventors have studied the ethylene polymers which are excellent in moldability and can be molded into articles excellent in mechanical strength and almost free from poor appearance. As a result, they have found that an ethylene polymer having a density and a melt flow rate (MFR) in the specific ranges, having a specific relationship between a melt tension (MT) and the melt flow rate and having a molecular weight distribution Mw/Mn, a molecular weight distribution Mz/Mw, a g* value indicating a proportion of long-chain branches and a swell ratio all in the specific ranges is excellent in moldability and can be molded into articles excellent in mechanical strength and almost free from poor appearance. The present inventors have also found that such an ethylene polymer as mentioned above can be prepared by the use of an ethylene polymerization catalyst comprising a specific solid titanium catalyst component. Based on these findings, the present invention has been accomplished.

The present invention has been made under such circumstances as mentioned above, and it is an object of the present invention to provide an ethylene polymer which is excellent in moldability and is capable of molding an article excellent in rigidity and impact resistance and free from poor appearance such as fish eye.

It is another object of the invention to provide a solid titanium catalyst component for ethylene polymerization which is suitably used for preparing the ethylene polymer, an ethylene polymerization catalyst comprising the solid titanium catalyst component and a process for preparing an ethylene polymer using the catalyst.

The ethylene polymer of the invention has the following properties:

(i) the density is in the range of 0.90 to 0.98 g/cm$^3$, (ii) the melt flow rate, as measured at 190° C. under a load of 2.16 kg, is in the range of 0.001 to 3,000 g/10 min, (iii) the melt tension (MT) and the melt flow rate (MFR) satisfy the relationship represented by the formula:

$$\log MT \geq -0.4 \log MFR + 0.75,$$

(iv) the molecular weight distribution Mw/Mn is in the range of 2 to 9, (v) the molecular weight distribution Mz/Mw is in the range of 2 to 5, (vi) the g* value, which is an index of a proportion of long-chain branches, is in the range of 0.90 to 1.00, and (vii) the swell ratio is more than 1.35.

The ethylene polymer of the invention can be prepared by the use of, for example, a Ziegler-Natta catalyst, preferably an ethylene polymerization catalyst comprising: (I) a solid titanium catalyst component obtained by the contact of oxygen with a solid titanium organometallic compound complex which is obtained by the contact with each other of (A) a solid titanium composite which is obtained by the contact with each other of (a) a solid magnesium aluminum composite containing magnesium, halogen and aluminum, and an alkoxy group having 6 or more carbon atoms and/or alcohol having 6 or more carbon atoms, the solid magnesium aluminum composite (a) being obtained by the contact with each other of (a-1) a magnesium solution formed from a halogen-containing magnesium compound, alcohol having 6 or more carbon atoms and a hydrocarbon solvent, and (a-2) an organoaluminum compound, and (b) a tetravalent titanium compound, wherein the titanium in the solid titanium composite (A) is substantially a valence of 4, and a molar ratio of the alkoxy group having 6 or more carbon atoms and/or alcohol having 6 or more carbon atoms to the titanium is in the range of 0.26 to 6.0, and (B) an organometallic compound containing a metal selected from Group I to Group III of the periodic table; and (II) an organometallic compound catalyst component containing a metal selected from Group I to Group III of the periodic table.

The ethylene polymer of the present invention has a density and a melt flow rate in the specific ranges, has a specific relationship between the melt tension (MT) and the melt flow rate (MFR), and has small values of Mw/Mn and Mz/Mw, a g* value of from 0.90 to 1.00 and a swell ratio of more than 1.35. Therefore, the ethylene polymer mentioned above is excellent in moldability, and a molded article obtained therefrom is excellent in rigidity and impact resistance, and free from occurrence of poor appearance such as fish eye.

The solid titanium catalyst component for ethylene polymerization of the present invention is obtained by the contact of oxygen with a solid titanium organometallic compound complex which is obtained by the contact with each other of (A) a solid titanium composite which is obtained by the contact with each other of (a) a solid magnesium aluminum composite containing magnesium, halogen and aluminum, and an alkoxy group having 6 or more carbon atoms and/or alcohol having 6 or more carbon atoms, the solid magnesium aluminum composite (a) being obtained by the contact with each other of (a-1) a magnesium solution formed from a halogen-containing magnesium compound, alcohol having 6 or more carbon atoms and a hydrocarbon solvent, and (a-2) an organoaluminum compound, and (b) a tetravalent titanium compound, wherein the titanium in the solid titanium composite (A) is substantially a valence of 4, and a molar ratio of the alkoxy group having 6 or more carbon atoms and/or alcohol having 6 or more carbon atoms to the titanium is in the range of 0.26 to 6.0; and (B) an organometallic compound containing a metal selected from Group I to Group III of the periodic table.

The prepolymerized solid titanium catalyst component for ethylene polymerization of the present invention is obtained by prepolymerizing an olefin with an ethylene polymerization catalyst comprising:

(I) the above-mentioned solid titanium catalyst component for ethylene polymerization, and (II) an organometallic compound catalyst component containing a metal selected from Group I to Group III of the periodic table.

The first ethylene polymerization catalyst of the present invention comprises:

(I) the above-mentioned solid titanium catalyst component for ethylene polymerization, and (II) an organometallic compound catalyst component containing a metal selected from Group I to Group III of the periodic table.

The second ethylene polymerization catalyst of the present invention comprises:

(I') the above-mentioned prepolymerized solid titanium catalyst component for ethylene polymerization, and (II) an organometallic compound catalyst component containing a metal selected from Group I to Group III of the periodic table.

The solid titanium catalyst component and the ethylene polymerization catalyst comprising the solid titanium catalyst component are suitable for preparing the ethylene polymer of the present invention.

The process for preparing an ethylene polymer, preferably an ethylene polymer having the properties (i) to (vii), of the present invention comprises homopolymerizing ethylene, or copolymerizing ethylene and α-olefin having 3 to 20 carbon atoms in the presence of the ethylene polymerization catalyst according to the present invention

BRIEF DESCRIPTION OF THE DRAWING

FIG. 1 is an explanatory view showing steps of a process for preparing an ethylene polymerization catalyst according to the present invention.

DETAILED DESCRIPTION OF THE INVENTION

The ethylene polymer, the solid titanium catalyst component for ethylene polymerization, the ethylene polymerization catalyst comprising the solid titanium catalyst component and the process for preparing an ethylene polymer using the ethylene polymerization catalyst, of the present invention, will be described below in detail.

The meaning of the term "polymerization" used herein is not limited to "homopolymerization", but may comprehend "copolymerization". Also, the meaning of the term "polymer" used herein is not limited to "homopolymer" but may comprehend "copolymer".

The ethylene polymer of the invention is a homopolymer of ethylene, a random copolymer of ethylene and an olefin, or a block copolymer of ethylene and an olefin.

The copolymer of ethylene and an olefin may contain constituent units derived from α-olefins of 3 to 20 carbon atoms, such as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene, in amounts of 10% by weight or less, preferably 5% by weight or less.

The copolymer may further contain constituent units derived from compounds having a large number of unsaturated bonds, for example aromatic vinyl compounds, such as styrene and allylbenzene, alicyclic vinyl compounds such as vinylcyclohexane, cycloolefins such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene, and dienes (conjugated dienes and non-conjugated dienes) such as 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, isoprene and butadiene, in amounts of 10% by weight or less, preferably 5% by weight or less.

The ethylene polymer of the invention has a density of 0.90 to 0.98 g/cm$^3$, preferably 0.92 to 0.98 g/cm$^3$, more preferably 0.94 to 0.98 g/cm$^3$. The density is measured as follows. A sample strand, having a length of 5 to 6 cm after measured on the melt flow rate, is placed in a constant temperature oil bath of 120° C. and kept therein for one hour. Then, water is gradually introduced into the oil bath and the bath is cooled from 120° C. to room temperature over one hour at a uniform rate. Thereafter, the sample is allowed to stand indoors at 23° C. for one hour, and two small strips (specimens) are cut out from the sample. After the specimens are wetted with methanol, they are gently put into a density gradient tube. After 15 minutes, the positions of the specimens are read out from the scale of the density gradient tube to determine an average value of the two specimens. The average value is reduced to a density from the calibration curve of the density and the scale of the density gradient tube drawn using a standard float. The standard float is a spherical glass having a diameter of from 3 to 5 mm, which is obtained by sealing one end of a glass capillary having a diameter of 1 to 2 mm, temporarily fusion bonding a nichrome wire to the sealed end of the capillary, cutting the capillary at the position of about 2 mm distance from the sealed end, holding the capillary thus cut with the nichrome wire, and swelling it by heating. The liquid in the density gradient tube is a mixture obtained by mixing methanol of reagent first grade defined by JIS K1501 with an aqueous solution of sodium acetate prepared using sodium acetate of reagent first grade defined by JIS K8371.

The ethylene polymer of the invention has a melt flow rate of 0.001 to 3,000 g/10 min, preferably 0.005 to 1,000 g/10 min, more preferably 0.01 to 100 g/10 min, most preferably 0.02 to 10 g/10 min.

The melt flow rate is measured as follows. An orifice having a size as defined by JIS K7210 is fitted to an automatic MFR measuring instrument produced by Tester Sangyo K. K. in accordance with JIS K7210. The barrel (place where a sample is introduced) is heated to 190° C. and kept at the same temperature. Into the barrel is introduced 4 g of a sample, and a piston is equipped in the barrel. Then, air bubbles are removed, and the barrel is preheated for 6 minutes. After the preheating, a load of 2,160 g is applied to push out the sample. The weight of the sample pushed out of the barrel per 10 minutes is measured, and the value thus measured is taken as a melt flow rate.

In the ethylene polymer of the invention, the melt tension (MT) and the melt flow rate (MFR) satisfy the relationship represented by the following formula:

$$\log MT \geq -0.4 \log MFR + 0.75,$$

preferably $\log MT \geq -0.4 \log MFR + 0.78,$ and more preferably $\log MT \geq -0.4 \log MFR + 0.80.$ When the melt flow rate is within the above range, and the melt tension and the melt flow rate satisfy the above relationship, the resulting ethylene polymers has excellent moldability. For example, when the ethylene polymer is molded into inflation films at high speed, vibration or the bursting of bubbles hardly occurs, and also when the ethylene polymer is subjected to hollow molding and sheet forming, drawdown hardly occurs.

The melt tension is determined by measuring a stress given when a molten ethylene polymer is stretched at a fixed rate. That is, the melt tension is measured using an MT measuring machine produced by Toyo Seiki Seisakusho K.K. under the conditions of a resin temperature of 190° C., an extrusion speed of 15 mm/min, a take-up speed of 10 to 20 m/in, a nozzle diameter of 2.09 mm and a nozzle length of 8 mm.

The ethylene polymer of the invention has a molecular weight distribution Mw/Mn (i.e., a ratio of a weight-average molecular weight (Mw) to a number-average molecular weight (Mn)) of 2 to 9, preferably 3 to 8, more preferably 4 to 7, and has a molecular weight distribution Mz/Mw (i.e., a ratio of a Z average molecular weight (Mz) to a weight-average molecular weight (Mw)) of 2 to 5, preferably 2.5 to 4.5, more preferably 3 to 4.

When the ethylene polymer has values of Mw/Mn and Mz/Mw within the above ranges, the molecular weight distribution is narrow and the content of a polymer having a molecular weight extremely larger than the average molecular weight is low. Hence, a molded article obtained from such polymer does not occur any poor appearance, such as fish eye.

The Mw/Mn and the Mz/Mw are measured in the following manner using a gel permeation chromatography (GPC).
Apparatus
  ALC/GPC 150C model, produced by Milipore Co.
Measuring conditions
  Column: GMH-HT6 (7.5 mmID×60 cm), produced by Toso K.K.
  Mobile phase: o-Dichlorobenzene (ODCB)
  Column temperature: 138° C.
  Flow rate: 1.0 ml/min
  Concentration of sample: 30 mg/20 ml
  Solution temperature: 140° C.
  Amount of influent: 500 ml
  Detector: differential refractometer
Determination of Mw/Mn and Mz/Mw
  The eluation time $R_{ti}$, the eluate quantity $H_i$, the molecular weight $M_i$, the number of macromolecules $N_i$ in the i section of the GPC eluation curve have the following relation:

$M_i = (j_i/K)^{1/\alpha+1}$ $(K = 2.0922 \times 10^{-4}, \alpha = 0.735)$ $j_i = P(1) + P(2) R_{ti} + P(3) R_{ti}^2 + P(4) R_{ti}^3$ $H_i = M_i N_i$ wherein P(1), P(2), P(3) and P(4) are values obtained through calculation from the calibration curve indicating a relation between the eluate quantity and the molecular weight obtained by the GPC measurement of a sample of standard polystyrene (Mw/Mn=1.1) under the above measuring conditions.

From the values of $M_i$ and $H_i$ thus obtained, Mn, Mw and Mz are calculated by the following formulas to determine Mw/Mn and Mz/Mw.

$Mn = \Sigma H_i / \Sigma (H_i/M_i)$ $Mw = \Sigma H_i M_i / \Sigma H_i$ $Mz = \Sigma H_i M_i^2 / \Sigma H_i M_i$

[See Pollock, D., and Kratz, F. F.: GPC Sixth International Seminar (1968), and Mori, Sadao: "Size Exclusion Chromatography", pp.51–56, Published on Dec. 1, 1991 (Kyoritsu Shuppan)].

The g* value of the ethylene polymer of the invention, which is an index of the proportion of long-chain branches, is in the range of 0.90 to 1.00, preferably 0.92 to 1.00, more preferably 0.95 to 1.00.

When the g* value is within the above range, the ethylene polymer has a small proportion of the long-chain branches in the polymer, and hence a molded article obtained therefrom is excellent in rigidity and impact resistance.

The g* value is determined in the following manner using GPC. That is, the values $M_i$ and $H_i$ are measured under the same measuring conditions as described above. Then, a value of $(\eta)_{GPC}^{ODCB}$ is calculated by the following formula:

$(\eta)_{GPC}^{ODCB} = K(\Sigma H_i (M_i) \alpha / \Sigma H_i)$ wherein K, $\alpha$, $H_i$ and $M_i$ are the same as defined above.

The obtained value is corrected to a value $((\eta)_{GPC})$ given in a decalin solvent in accordance with a literature "GPC Sixth International Seminar" by Pollock, D., and Kratz, F. F., 1968. Further, each sample is also measured on the intrinsic viscosity $((\eta)_{obs})$ at 135° C. in a decalin solvent.

Using the values thus obtained, the g* value is calculated by the following formula.

$g^* = (\eta)_{obs} / (\eta)_{GPC}$

The ethylene polymer of the invention has a swell ratio (SR) of more than 1.35, preferably more than 1.35 but not more than 1.50.

When the swell ratio is within the above range, the ethylene polymer is excellent in moldability.

For example, when a bottle is produced from such an ethylene polymer by hollow molding, the shape of pinch-off scar is improved, and hence the resulting bottle has an excellent mechanical strength. Further, since the thickness distribution of the hollow molded article can be narrowed, the amount of the bottle material per one bottle can be reduced, and moreover the buckling strength of the bottle can be increased when the same amount of the material is used.

The swell ratio is measured as follows. A nozzle having a diameter ($D_0$) of 3.0 mm and a length (L) of 3 mm is fitted to Capirograph-IB produced by Toyo Seiki Seisakusho K. K. The barrel (place where a sample is introduced) is heated to 200° C. and kept at the same temperature. Into the barrel is introduced 10 g of a sample, and a piston is provided in the barrel. Then, air bubbles are removed, and the barrel is preheated for 6 minutes. After the preheating, the sample is extruded at shear rates of 0.25, 0.5, 1, 2.5, 5, 10 and 25 sec$^{-1}$, and a diameter ($D_i$) of the strand 15 mm below the nozzle tip is measured using a laser beam. Then, a ratio ($SR_i = D_i/D_0$) of the strand diameter ($D_i$) thus measured to the nozzle diameter ($D_0$) is determined.

From the curve obtained by plotting the $SR_i$ for each shear rate on a semi-logarithmic paper, a value at the shear rate of 9.98 sec$^{-1}$ is read out and taken as a swell ratio.

The ethylene polymer of the invention has a high melt tension, a high swell ratio, a narrow molecular weight distribution and a small proportion of long-chain branches. Such an ethylene polymer has not been found yet so far.

Since the ethylene polymer of the invention has the above-mentioned properties, it is excellent in moldability. Further, the molded article obtained from the ethylene polymer is excellent in rigidity and impact resistance and free from occurrence of poor appearance. Such an ethylene polymer can be favorably used as a material of various molded articles such as a hollow molded article and an extrusion molded article.

When the ethylene polymer of the invention is used as a material of the hollow molded article, the polymer preferably has the following properties:

the density is in the range of 0.94 to 0.97 g/cm$^3$;

the melt flow rate, as measured at 190° C. under a load of 2.16 kg, is in the range of 0.01 to 10 g/10 min;

the melt tension (MT) and the melt flow rate (MFR) satisfy the relationship represented by the formula:

$\log MT \geq -0.4 \log MFR + 0.75$;

the molecular weight distribution Mw/Mn is in the range of 3 to 8;

the molecular weight distribution Mz/Mw is in the range of 2.5 to 4.5;

the g* value is in the range of 0.95 to 1.00; and the swell ratio is more than 1.35 but not more than 1.50.

When the ethylene polymer of the invention is used as a material of the extrusion molded article, the polymer preferably has the following properties:

the density is in the range of 0.94 to 0.97g/cm$^3$;

the melt flow rate, as measured at 190° C. under a load of 2.16 kg, is in the range of 0.01 to 10 g/10 min;

the melt tension (MT) and the melt flow rate (MFR) satisfy the relationship represented by the formula:

$\log MT \geq -0.4 \log MFR + 0.75$;

the molecular weight distribution Mw/Mn is in the range of 3 to 8;

the molecular weight distribution Mz/Mw is in the range of 2.5 to 4.5;

the g* value is in the range of 0.95 to 1.00; and the swell ratio is more than 1.35 but not more than 1.50.

The ethylene polymer of the invention as mentioned above can be prepared using, for example, a Ziegler-Natta catalyst, but it is desirable to be prepared by polymerizing ethylene or-copolymerizing ethylene and olefin in the presence of an ethylene polymerization catalyst containing a solid titanium catalyst component which will be described later.

The solid titanium catalyst component for ethylene polymerization of the present invention will be described hereinbelow.

The solid titanium catalyst component for ethylene polymerization of the present invention is obtained by the contact of oxygen with a solid titanium organometallic compound complex which is obtained by the contact with each other of:

(A) a solid titanium composite which is obtained by the contact with each other of:
   (a) a solid magnesium aluminum composite containing magnesium, halogen and aluminum, and an alkoxy group having 6 or more carbon atoms and/or alcohol having 6 or more carbon atoms,
   the solid magnesium aluminum composite (a) being obtained by the contact with each other of
      (a-1) a magnesium solution formed from a halogen-containing magnesium compound, alcohol having 6 or more carbon atoms and a hydrocarbon solvent, and
      (a-2) an organoaluminum compound, and
   (b) a tetravalent titanium compound,
wherein the titanium in the solid titanium composite (A) is substantially a valence of 4, and a molar ratio of the alkoxy group having 6 or more carbon atoms and/or alcohol having 6 or more carbon atoms to the titanium is in the range of 0.26 to 6.0; and (B) an organometallic compound containing a metal selected from Group I to Group III of the periodic table.

The solid magnesium aluminum composite (a), tetravalent titanium compound (b), solid titanium composite (A) and organometallic compound (B) are described hereinbelow.

The solid magnesium aluminum composite (a) containing magnesium, halogen and aluminum, and an alkoxy group having 6 or more carbon atoms and/or alcohol having 6 or more carbon atoms is firstly described.

The solid magnesium aluminum composite (a) is obtained by the contact with each other of:
   (a-1) a magnesium solution formed from a halogen-containing magnesium compound, alcohol having 6 or more carbon atoms and a hydrocarbon solvent, and
   (a-2) an organoaluminum compound.

In the solid magnesium aluminum composite (a), aluminum/magnesium (atomic ratio) is usually 0.05 to 1, preferably 0.08 to 0.7, more preferably 0.12 to 0.6, halogen/magneisum (atomic ratio) is usually 1 to 3, preferably 1.5 to 2.5, and the alkoxy group having 6 or more carbon atoms and/or alcohol having 6 or more carbon atoms is in an amount of usually 0.5 to 15 parts by weight, preferably 2 to 13 parts by weight, more preferably 5 to 10 parts by weight, based on 1 part by weight of magnesium.

The solid magneisum aluminum composite (a) has a particle diameter of preferably 1 to 200 $\mu$m, more preferably 2 to 100 $\mu$m, and a particle size distribution of 1.0 to 2.0, preferably 1.0 to 1.8 in terms of geometric standard deviation, and the composite (a) is desirably in the shape of granular.

The halogen-containing magnesium compounds for preparing a magneisum solution (a-1) include:

magnesium halides such as magnesium chloride, magnesium bromide, magnesium iodide and magnesium fluoride;

alkoxymagnesium halides such as methoxymagnesium chloride, ethoxymagnesium chloride, isopropoxymagnesium chloride, butoxymagnesium chloride and octoxymagnesium chloride;

aryloxymagnesium halides such as phenoxymagnesium chloride and methylphenoxymagnesium chloride;

alkoxymagnesiums such as diethoxymagnesium, diisopropoxymagnesium, dibutoxymagnesium and dioctoxymagnesium;

aryloxymagnesiums such as diphenoxymagnesium and dimethylphenoxymagnesium; and magnesium carboxylates such as magnesium laurate and magnesium stearate.

The halogen-containing magnesium compounds may be a complex compound of any of the above compounds and other metal, a composite compound of any of the above compounds and other metal and a mixture of any of the above compounds and other metal compound.

Of these, preferred are magnesium halides and alkoxymagnesium halides, more preferred are magnesium chloride and alkoxymagnesium chloride, and particularly preferred is magnesium chloride.

These halogen-containing magnesium compound may be used alone or in combination.

Examples of the alcohols having 6 or more carbon atoms for preparing the magnesium solution (a-1) in the present invention include:

aliphatic alcohols such as 2-methylpentanol, 2-ethylpentanol, 2-ethylbutanol, n-heptanol, n-octanol, 2-ethylhexanol, decanol, dodecanol, tetradecyl alcohol, undecenol, oleyl alcohol and stearyl alcohol;

alicyclic alcohols such as cyclohexanol and methylcyclohexanol;

aromatic alcohols such as benzyl alcohol, methylbenzyl alcohol, isopropylbenzyl alcohol, $\alpha$-methylbenzyl alcohol and $\alpha,\alpha$-dimethylbenzyl alcohol; and aliphatic alcohols containing alkoxy group such as n-butyl cellosolve and 1-butoxy-2-propanol.

Of these, preferred are monovalent alcohols having 7 or more carbon atoms, and particularly preferred is 2-ethylhexanol.

These alcohols may be used alone or in combination.

Examples of the hydrocarbon solvents for preparing the magnesium solution (a-1) in the present invention include:

aliphatic hydrocarbons, such as propane, butane, n-pentane, iso-pentane, n-hexane, iso-hexane, n-heptane, n-octane, iso-octane, n-decane, n-dodecane and kerosine;

alicyclic hydrocarbons, such as cyclopentane, methylcyclopentane, cyclohexane and methylcyclohexane;

aromatic hydrocarbons, such as benzene, toluene and xylene; and halogenated hydrocarbons, such as methylene dichloride, ethylene chloride, ethylene dichloride and chlorobenzene.

Of these, preferred are aliphatic hydrocarbons, and particularly preferred are aliphatic hydrocarbons of 3 to 10 carbon atoms. These hydrocarbon solvents may be used alone or in combination.

When the halogen-containing magneisum compound, alcohol having 6 or more carbon atoms and hydrocarbon solvents are brought into contact with each other, the halogen-cotaining magnesium compound is dissolved in the hydrocarbon solvent to obtain a magnesium solution (a-1).

The contact of the halogen-containing mangesium compound, alcohol having 6 or more carbon atoms and hydrocarbon solvent with each other varies depending on the kind of the compounds and alcohols to be used and, however, it is carried out usually at room temperature or higher, preferably 65° C. or higher, more preferably about 80 to 300° C., most preferably about 100 to about 200° C., for about 15 minutes to 5 hours, more preferably about 30 minutes to 3 hours.

The alcohol varies depending on the kind of the magnesium compounds and solvents to be used, and however, it is used in an amount of usually about 1 mol or more, preferably about 1.5 to about 20 moles, more preferably about 2.0 to about 12 moles, based on 1 mol of the halogen-containing magnesium compound.

The hydrocarbon solvent is preferably used in such an amount that the concentration of magnesium in the resulting magnesium solution becomes 0.005 to 2 mol/liter.

The solid magnesium aluminum composite (a) is obtained by bringing the magnesium solution (a-1) into contact with the organoaluminum compound (a-2) as described hereinafter.

As the organoaluminum compound (a-2) for preparing the solid magnesium aluminum composite (a), preferred is the organoaluminum compound represented by the following formula:

$$R^a{}_nAlX_{3-n}$$

wherein $R^a$ is a hydrocarbon group of 1 to 12 carbon atoms, X is a halogen atom or a hydrogen atom, and n is 1 to 3.

In the above formula, the hydrocarbon group of 1 to 12 carbon atoms includes an alkyl group, a cycloalkyl group or an aryl group, more specifically, methyl, ethyl, n-propyl, isopropyl, isobutyl, pentyl, hexyl, octyl, cyclopentyl, cyclohexyl, phenyl or tolyl.

Examples of such organoaluminum compounds (a-2) include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride;

Also employable as the organoaluminum compound (a-2) is a compound represented by the following formula:

$$R^a{}_nAlY_{3-n}$$

wherein $R^a$ is the same as defined above, n is 1 to 2; Y is —$OR^b$, —$OSiR^c{}_3$, —$OAlR^d{}_2$, —$NR^e{}_2$, —$SiR^f{}_3$ or —$N(R^g)AlR^h{}_2$; $R^b$, $P^c$, $R^d$ and $R^h$ are each methyl, ethyl, isopropyl, isobutyl, cyclohexyl or phenyl; $R^e$ is hydrogen, methyl, ethyl, isopropyl, phenyl or trimethylsilyl; and Rf and Rg are each methyl or ethyl.

Examples of such organoaluminum compounds include:
(1) compounds of the formula: $R^a{}_nAl(OR^b)_{3-n}$, e.g., dimethylaluminum methoxide, diethylaluminum ethoxide and diisobutylaluminum methoxide;
(2) compounds of the formula: $R^a{}_nAl(OSiR^c{}_3)_{3-n}$, e.g., $Et_2Al(OSiMe_3)$, $(iso-Bu)_2Al(OSiMe_3)$ and $(iso-Bu)_2Al(OSiEt_3)$;
(3) compounds of the formula: $R^a{}_nAl(OAlR^d{}_2)_{3-n}$, e.g., $Et_2AlOAlEt_2$ and $(iso-Bu)_2AlOAl(iso-Bu)_2$;
(4) compounds of the formula: $R^a{}_nAl(NR^e{}_2)_{3-n}$, e.g., $Me_2AlNEt_2$, $Et_2AlNHMe$, $Me_2AlNHEt$, $Et_2AlN(Me_3Si)_2$ and $(iso-Bu)_2AlN(Me_3Si)_2$;
(5) compounds of the formula: $R^a{}_nAl(SiR^f{}_3)_{3-n}$, e.g., $(iso-Bu)_2AlSiMe_3$; and
(6) compounds of the formula: $R^a{}_nAl(N(R^g)AlR^h{}_2)_{3-n}$, e.g., $Et_2AlN(Me)AlEt_2$ and $(iso-Bu)_2AlN(Et)Al(iso-Bu)_2$.

As the above-exemplified organoaluminum compound (a-2), there can be used an alkyl complex compound of Group I metal and aluminum represented by the general formula:

$$M^1AlR^j{}_4$$

wherein $M^1$ is Li, Na or K, and $R^j$ is a hydrocarbon group of 1 to 15 carbon atoms.

Examples of such alkyl complex compounds include LiAl$(C_2H_5)_4$ and LiAl$(C_7H_{15})_4$. Of these, preferred are trialkylaluminum, dialkylaluminum halide, dialkylauminum hydride, dialkylaluminum alkoxide, and particularly preferred is trialkylaluminum. These organoaluminum compounds may be used alone or in combination.

In preparing the solid magnesium aluminum composite (a), the organoaluminum compound (a-2) is used preferably in an amount such that the molar ratio (ROH/Al) of alcohol (ROH) having 6 or more carbon atoms used for preparing the magneisum solution (a-1) to aluminum in the organoaluminum compound (a-2) becomes about 0.5 to 7, preferably 1 to 5.

The contact temperature at which the magneisum solution (a-1) is brought into contact with the organoaluminum compound (a-2) is usually in the range of –50 to 150° C., preferably –30 to 100° C.

The solid magnesium aluminum composite (a) can be prepared, for example, by gradually dropwise adding the organoaluminum compound (a-2) into the magneisum solution (a-1) while stirring for 0.2 to 2 hours in an amount such that the concentration of magnesium in the solution becomes preferably 0.005 to 2 mol/liter, more preferably 0.05 to 1 mol/liter. In this way, there can be obtained a solid magneisum aluminum composite (a) having a good particle shape. The thus prepared solid magnesium aluminum composite (a) does not have an organic group having reducing ability, and therefore, it does not exhibit reducing ability.

The solid titanium composite (A) to be used in the present invention is obtained by bringing the solid mangesium aluminum composite (a) into contact with the tetravalent titanium compound (b) as described hereinbelow.

Examples of the tetravalent titanium compound (b) include the compound represented by the following formula:

$$Ti(OR^1)_mX_{4-m}$$

wherein $R^1$ is a hydrocarbon group, X is a halogen atom, and m is a number of $0 \leq m \leq 3$.

Examples of such tetravalent titanium compounds include:
titanium tetrahalides, such as $TiCl_4$, $TiBr_4$, $TiI_4$;
alkoxytitanium trihalides, such as $Ti(OCH_3)Cl_3$, $Ti(OC_2H_5)Cl_3$, $Ti(On-C_4H_9)Cl_3$, $Ti(OC_2H_5)Br_3$ and $Ti(O-iso-C_4H_9)Br_3$;
dialkoxytitanium dihalides, such as $Ti(OCH_3)_3Cl$, $Ti(OC_2H_5)_2Cl_2$, $Ti(On-C_4H_9)_2Cl_2$ and $Ti(OC_2H_5)Br_2$; and trialkoxytitanium monohalides, such as Ti(OCH$_3$)$_3$Cl, Ti(OC$_2$H$_5$)$_3$Cl, Ti(On-C$_4$H$_9$)$_3$Cl and Ti (OC$_2$H$_5$)$_3$Br.

Of these, preferred are titanium tetrahalides, and particularly preferred is titanium tetrachloride. These tetravalent titanium compounds may be used alone or in combination.

In preparing the solid titanium composite (A), the tetravalent titanium compound (b) is used in an amount such that the atomic ratio [Ti/(Mg+A)] of the total amount of the magnesium (Mg) and aluminum (Al) in the solid magnesium aluminum composite (a) to the titanium (Ti) in the titanium compound is in the range of 0.005 to 18, preferably 0.01 to 15.

The contact of the solid magnesium aluminum composite (a) with the tetravalent titanium compound (b) is carried out preferably in a hydrocarbon solvent. As the hydrocarbon solvent, the aforesaid hydrocarbon solvents used for preparing the magnesium solution (a-1) may be used.

The contact of the solid magnesium aluminum composite (a) with the tetravalent titanium compound (b) is carried out at a temperature of usually 0 to 150° C., preferably 50 to 130° C., more preferably 50 to 120° C.

The thus prepared solid titanium composite (A) contains magnesium, halogen, aluminum, titanium, and an alkoxy group having 6 or more carbon atoms and/or alcohol having 6 or more carbon atoms as essential ingredients. The tetravalent titanium contained in the solid titanium composite (A) is 90% or more, preferably 95% or more, more preferably 100%.

In the solid titanium composite (A), titanium/magnesium (atomic ratio) is usually 0.01 to 1.5, preferably 0.05 to 1.0, and aluminum/magnesium (atomic ratio) is usually 0.1 to 2.0, preferably 0.13 to 1.5, particularly preferably 0.15 to 1.2, and the alkoxy group having 6 or more carbon atoms and/or alcohol having 6 or more carbon atoms is in an amount of usually 0.1 to 15 parts by weight, preferably 0.3 to 10 parts by weight, more preferably 0.5 to 6 parts by weight, based on 1 part by weight of magnesium.

The molar ratio (-OR/R-OH)/Ti of the alkoxy group having 6 or more carbon atoms and/or alcohol having 6 or more carbon atoms to the titanium is in the range of 0.26 to 6.0, preferably 0.26 to 5.0, more preferably 0.26 to 4.0.

The atomic ratio (Hal/Mg) of the halogen (Hal) to magnesium (Mg) is in the range of 0.5 to 20, preferably 0.5 to 15, more preferably 0.5 to 10.

The solid titanium composite (A) has a particle diameter of 1 to 200 μm, preferably 2 to 100 μm, and a particle size distribution of 1.0 to 2.0, preferably 1.0 to 1.8 in terms of geometric standard deviation.

The solid titanium catalyst component for ethylene polymerization of the present invention can be prepared by initially bringing the solid titanium composite (A) which is obtained by the contact of the solid magnesium aluminum composite (a) with the tetravalent titanium compound (b), into contact with the organometallic compound (B) containing a metal selected from Group I to III of the periodic table to prepare a solid titanium organometallic compound complex, and then bringing the solid titanium organometallic compound complex into contact with oxygen.

As the organometallic compound (B) containing a metal selected from Group I to III of the periodic table to be used in the present invention, there can be used, for example, an organoaluinum compound, an alkyl complex compound of Group I metal and aluminum, and an organometallic compound of Group II metal.

Examples of the organoaluminum compound and the alkyl complex compound of Group I metal and aluminum are identical with those of the organoaluminum and alkyl complex compounds of Group I metal and aluminum as exemplified in the organoaluminum compound (a-2).

The organometallic compound of Group II metal is, for example, a compound represented by the formula:

$$R^k R^1 M^2$$

wherein $R^k$ and $R^1$ are each a hydrocarbon group of 1 to 15 carbon atoms or a halogen atom, which may be the same or different except that both $R^k$ and $R^1$ are halogen atoms, and $M^2$ is Mg, Zn or Cd. Examples of such organometallic compounds include diethylzinc, diethylmagnesium, butylethylmagnesium, ethylmagnesium chloride and butylmagnesium chloride.

As the organometallic compounds (B), preferred are trialkylaluminum, dialkylaluminum halide, dialkylaluminum hydride and dialkylaluminum alkoxide, and particularly preferred is trialkylaluminum.

These organometallic compounds containing a metal selected from Group I to Group III of the periodic table may be used alone or in combination.

As the oxygen used herein, there can be exemplified oxygen gas, air, ozone and organic peroxide.

The contact of the solid titanium composite (A) with the organometallic compound (B) can be carried out in a solvent. Examples of the solvents are identical with those of the inert solvents used for preparing the magnesium solution (a-1). Of the aforementioned solvents, preferred are aliphatic hydrocarbons, and particularly preferred are saturated aliphatic hydrocarbons having 6 to 10 carbon atoms.

In the contact of the solid titanium composite (A) with the organometallic compound (B), the organometallic compound (B) is used in an amount of 0.1 to 100 mol, preferably 1 to 50 mol, based on 1 mol of the titanium atom in the solid titanium composite (A), and the concentration of the solid titanium composite (A) is in the range of 0.1 to 100 mol/liter-solvent, preferably 0.5 to 50 mol/liter-solvent, in terms of the titanium atom in the solid titanium composite (A). The contact time is in the range of 1 to 300 minutes, preferably 5 to 180 minutes, and the contact temperature is in the range of 0 to 100° C., preferably 10 to 50° C.

In the contact of the solid titanium organometallic compound complex with oxygen, the oxygen is used in an amount of 0.1 mol or more, preferably 0.1 to 100 mol, more preferably 0.2 to 10 mol, most preferably 0.3 to 3 mol, based on 1 mol of the titanium atom in the solid titanium organometallic compound complex. The contact time is in the range of 1 to 300 minutes, preferably 5 to 180 minutes, and the contact temperature is in the range of 0 to 100° C., preferably 10 to 50° C.

There is no specific limitation on the method of contacting the solid titanium organometallic compound complex with oxygen, but the following contact methods may be mentioned:

(1) A method of bringing a suspension of the solid titanium organometallic compound complex in an inert solvent into contact with air;

(2) A method of bringing a suspension of the solid titanium organometallic compound complex in an inert solvent into contact with ozone; and (3) A method of bringing a suspension of the solid titanium organometallic compound complex in an inert solvent into contact with gaseous oxygen.

Examples of the solvents used in the contact of the solid titanium organometallic compound complex with oxygen are identical with those of the inert solvents used for preparing the magnesium solution (a-1). Of the aforementioned solvents, preferred are aliphatic hydrocarbons, and particularly preferred are saturated aliphatic hydrocarbons having 6 to 10 carbon atoms.

By the contact of the solid titanium organometallic compound complex with oxygen, titanium in the complex is presumably bonded to oxygen.

The solid titanium catalyst component for ethylene polymerization of the present invention is prepared as described above.

The prepolymerized solid titanium catalyst component for ethylene polymerization of the present invention is obtained by prepolymerizing an olefin with an ethylene polymerization catalyst comprising (I) the solid titanium catalyst component, and
(II) the organometallic compound catalyst component containing a metal selected from Group I to III of the periodic table.

As the olefin used in the prepolymerization, preferred is ethylene alone or ethylene and a small amount of α-olefin having 3 to 20 carbon atoms.

Examples of the organometallic compound catalyst component containing a metal selected from Group I to III of the periodic table for forming the prepolymerized solid titanium catalyst component for ethylene polymerization are identical with those of the organometallic compound containing a metal selected from Group I to III of the periodic table (B), as mentioned above. Of these, preferred are trialkylaluminum, dialkylaluminum halide, dialkylaluminum hydride, dialkylaluminum alkoxide, and particularly preferred is trialkylaluminum.

The first ethylene polymerization catalyst of the present invention comprises (I) the solid titanium catalyst component for ethylene polymerization, and
(II) the oranometallic compound catalyst component.

The second ethylene polymerization catalyst of the present invention comprises (I') the prepolymerized solid titanium catalyst component for ethylene polymerization, and
(II) the organometallic compound catalyst component.

Examples of the organometallic compound catalyst component containing a metal selected from Group I to III of the periodic table (II) for forming the ethylene polymerization catalyst are identical with those of the organometallic compound containing a metal selected from Group I to III of the periodic table (B) as mentioned above. Of these, preferred are trialkylaluminum, dialkylaluminum halide, dialkylaluminum hydride, dialkylaluminum alkoxide, and particularly preferred is trialkylaluminum.

FIG. 1 is an explanatory view showing steps of the process for preparing the ethylene polymerizationc catalyst according to the present invention.

In the process for preparing an ethylene polymer according to the present invention, polymerization of ethylene or copolymerization of ethylene and olefin having 3 to 20 carbon atoms are carried out in the presence of the first or the second ethylene polymerization catalyst.

Examples of the olefin having 3 to 20 carbon atoms employable together with ethylene in the prolymerization include propylene, 2-methylpropylene, 1-butene, 1-pentene, 1-hexene, 4-methyl-1-pentene, 3-methyl-1-pentene, 1-octene, 1-nonene, 1-decene, 1-undecene and 1-dodecene.

Further, in addition to the ethylene and olefin having 3 to 20 carbon atoms, polyenes may also be copolymerized. Examples of polyenes include butadiene, isoprene, 1,4-hexadiene, dicyclopentadiene and 5-ethylidene-2-norbornene.

In the copolymerization of ethylene and other olefins, copolymers containing 90% by mol or more of units derived from ethylene may preferably be produced.

In the polymerization, the solid titanium catalyst component (I) is used in an amount of usually about 0.00001 to about 1 mmol, preferably about 0.0001 to about 0.1 mmol, in terms of Ti atom, based on 1 liter of the polymerization volume. The organometallic compound catalyst component (II) is used in an amount of usually 1 to 1,000 mol, preferably 2 to 500 mol, based on 1 g of the titanium atom in the solid titanium catalyst component (I) for ethylene polymerization.

The solid titanium catalyst component for ethylene polymerization may also be used by supporting it on carrier compounds as described below.

Examples of the carrier compounds employable herein include metallic oxides such as $Al_2O_3$, $SiO_2$, $B_2O_3$, MgO, CaO, $TiO_2$, ZnO, $ZnO_2$, $SnO_2$, BaO and ThO, and resins such as a styrene-divinylbenzene copolymer.

If hydrogen is used in the polymerization, the molecular weight of the resulting polymer can be regulated.

The polymerization of ethylene polymer may be conducted by any of a liquid phase polymerization such as a solution polymerization and a suspension polymerization, and a gas phase polymerization. The polymerization can be conducted batchwise, semicontinuously or continuously.

When the polymerization is conducted by a slurry polymerization, inert solvents may be used as the reaction solvent, and ethylene which is liquid at the polymerization temperature may also be used as the reaction solvent. Examples of the inert solvent used herein include:

aliphatic hydrocarbons, such as propane, butane, n-pentane, iso-pentane, n-hexane, iso-hexane, n-heptane, n-octane, iso-octane, n-decane, n-dodecane and kerosine;

alicyclic hydrocarbons, such as cyclopentane, methylcyclopentane, cyclohexane and methylcyclohexane; and aromatic hydrocarbons, such as benzene, toluene, xylene and ethylebenzene. These inert solvents may be used alone or in combination.

The polymerization temperature is in the range of usually 20 to 150° C., preferably 50 to 120° C., more preferably 70 to 110° C., and the polymerization pressure is in the range of usually 1 to 1,000 $kg/cm^2$, preferably 2 to 40 $kg/cm^2$. Further, the polymerization can be carried out in two or more stages.

The ethylene polymer obtained as above may be any of an ethylene homopolymer, an ethylene-olefin random copolymer and an ethylene-olefin block copolymer. Of these, preferred are an ethylene homopolymer and an ethylene-olefin random copolymer.

EFFECTS OF THE INVENTION

The ethylene polymer according to the invention has a density and a melt flow rate (MFR) in the specific ranges, has a specific relation between the melt tension (MT) and the melt flow rate (MFR), and has a Mw/Mn value, a Mz/Mw value, a g* value and a swell ratio in the specific ranges. Hence, the ethylene polymer is excellent in moldability, and a molded article obtained therefrom is excellent in rigidity and impact strength and free from poor appearance such as fish eye.

By the process for preparing an ethylene polymer according to the invention, an ethylene polymer having excellent properties as mentioned above can be prepared with high polymerization activity.

By the use of the solid titanium catalyst component for ethylene polymerization and the ethylene polymerization catalyst according to the invention, an ethylene polymer having excellent properties as mentioned above can be prepared with high polymerization activity.

PREFERRED EMBODIMENTS

The present invention will be further described with reference to the following examples, but it should be construed that the invention is in no way limited to those examples.

EXAMPLE 1

Preparation of a Solid Titanium Composite (A)

4.8 g of anhydrous magnesium chloride, 19.5 g of 2-ethylhexythanol and 200 ml of decane were heated at 140° C. for 3 hours to give a homogeneous solution. To the solution was dropwise added a mixture of 60 mmol of triethylalminium and 52 ml of decane with stirring at 20° C. over a period of 30 minutes. The temperature of the mixture was elevated to 80° C. over 2 hours, and then the mixture was heated for 2 hours. Thereafter, the solid produced was collected by means of filtration, and washed once by 200 ml of decane. Through the above procedures, a solid magnesium aluminum composite was prepared.

The solid magnesium aluminum composite prepared as above was resuspended in 200 ml of decane, followed by adding 400 mmol of titanium tetrachloride, performing a reaction for 2 hours at 80° C., and thoroughly washing by hexane. Through the above procedures, a hexane suspension of a solid titanium composite (A), was prepared.

This solid titanium composite (A) had a composition comprising 7.3% by weight of titanium, 8.8% by weight of magnesium, 5.0% by weight of aluminum, 53% by weight of chlorine and 10.5% by weight of 2-ethylhexoxy group.

Preparation of a Solid Titanium Catalyst Component (B-1)

Into a 200-ml four-necked flask was introduced 100 ml of hexane at room temperature (26° C.) while purging the flask with nitrogen. To the flask were added 3 mmol (in terms of aluminum atom) of triethylaluminum and 1 mmol (in terms of titanium atom) of the above-obtained solid titanium composite (A), followed by stirring at room temperature for 1 hour. After the stirring was completed, the solid produced was separated from the liquid by means of decantation. To the solid was added hexane, and they were stirred. Then, a washing operation to remove the supernatant liquid through decantation was repeated three times.

The resulting material was resuspended in 100 ml of hexane. Then, 58.4 ml of dry air containing 11.2 Nml of oxygen was introduced into the gas phase zone, followed by stirring at room temperature for 1 hour. During the stirring, the volume decrease of the gas phase zone was measured using a gas burette. As a result, the volume decrease was 8 ml, and the amount of oxygen absorption was 7.3 Nml.

After the stirring was completed, the solid produced was separated from the liquid by means of decantation. To the solid was added hexane, and they were stirred. Then, a washing operation to remove the supernatant liquid through decantation was repeated twice, to obtain a solid titanium catalyst component (B-1).

Polymerization

Into a 2-liter autoclave was introduced 1 liter of purified hexane. To the autoclave were added 1 mmol of triethylaluminum and 0.01 mmol (in terms of titanium atom) of the solid titanium catalyst component (B-1) at 60° C. in an ethylene atmosphere.

Then, the temperature of the system was elevated up to 75° C., and hydrogen was introduced in such an amount that the gauge pressure became 1 kg/cm$^2$. Subsequently, ethylene was fed so that the gauge pressure became e kg/cm$^2$, followed by continuously feeding ethylene to keep the same pressure for 1 hour. During the feeding procedure, the temperature was kept at 80° C.

After the polymerization was completed, the slurry containing a solid product was filtered and separated into a white powder and a liquid phase. The white powder thus obtained was dried at 80° C. for 10 hours under reduced pressure.

To 100 g of the dried white powder (ethylene polymer) were added 200 mg of 3,5-di-tertiarybutyl-4-hydroxytoluene and 100 mg of calcium stearate. The resulting mixture was pelletized at 200° C. using an extruder having a diameter of 20 mm (produced by Thermoplastic Co.). The pellets were measured on a melt tension (MT), a melt flow rate (MFR), a swell ratio (SR), a molecular weight distribution Mw/Mn, a molecular weight distribution Mz/Mw, a g* value and a density in accordance with the methods described before. The results are shown in table 1.

EXAMPLE 2

Preparation of a Solid Titanium Catalyst Component (B-2)

Into a 200-ml four-necked flask was introduced 100 ml of hexane at room temperature (25° C.) while purging the flask with nitrogen. To the flask were added 3 mmol (in terms of aluminum atom) of triethylaluminum and 1 mmol (in terms of titanium atom) of the solid titanium composite (A) prepared in Example 1, followed by stirring at room temperature for 1 hour. After the stirring was completed, the solid produced was separated from the liquid by means of decantation. To the solid was added hexane, and they were stirred. Then, a washing operation to remove the supernatant liquid through decantation was repeated three times.

The resulting material was resuspended in 100 ml of hexane. Then, 29.1 ml of dry air containing 5.6 Nml of oxygen was introduced into the gas phase zone, followed by stirring at room temperature for 1 hour. During the stirring, the volume decrease of the gas phase zone was measured using a gas burette. As a result, the volume decrease was 4 ml, and the amount of oxygen absorption was 3.7 Nml.

After the stirring was completed, the solid produced was separated from the liquid by means of decantation. To the solid was added hexane, and they were stirred. Then, a washing operation to remove the supernatant liquid through decantation was repeated twice, to obtain a solid titanium catalyst component (B-2).

Polymerization

Polymerization of ethylene was carried out in the same manner as described in Example 1 except that the solid titanium catalyst component (B-2) was used in place of the solid titanium catalyst component (B-1).

After the polymerization was completed, the slurry containing a solid product was filtered and separated into a white powder and a liquid phase. The white powder thus obtained was dried at 80° C. for 10 hours under reduced pressure.

The dried white powder (ethylene polymer) was measured on various properties in the same manner as described in Example 1. The results are shown in Table 1.

EXAMPLE 3

Preparation of a Solid Titanium Catalyst Component (B-3)

Into a 200-ml four-necked flask was introduced 100 ml of hexane at room temperature (25° C.) while purging the flask with nitrogen. To the flask were added 3 mmol (in terms of aluminum atom) of triethylaluminum and 1 mmol (in terms of titanium atom) of the solid titanium catalyst component (A) prepared in Example 1, followed by stirring at room temperature for 1 hour. After the stirring was completed, the solid produced was separated from the liquid by means of decantation. To the solid was added hexane, and they were stirred. Then, a washing operation to remove the supernatant liquid through decantation was repeated three times.

The resulting material was resuspended in 100 ml of hexane. Then, 87.1 ml of dry air containing 16.8 Nml of oxygen was introduced into the gas phase zone, followed by stirring at room temperature for 1 hour. During the stirring, the volume decrease of the gas phase zone was measured using a gas burette. As a result, the volume decrease was 12 ml, and the amount of oxygen absorption was 11.0 Nml.

After the stirring was completed, the solid produced was separated from the liquid by means of decantation. To the solid was added hexane, and they were stirred. Then, a purifying operation to remove the supernatant liquid through decantation was repeated twice, to obtain a solid titanium catalyst component (B-3).

Polymerization

Polymerization of ethylene was carried out in the same manner as described in Example 1 except that the solid titanium catalyst component (B-3) was used in place of the solid titanium catalyst component (B-1).

After the polymerization was completed, the slurry containing a solid product was filtered and separated into a white powder and a liquid phase. The white powder thus obtained was dried at 80° C. for 10 hours under reduced pressure.

The dried white powder (ethylene polymer) was measured on various properties in the same manner as described in Example 1. The results are shown in Table 1.

EXAMPLE 4

Polymerization

Polymerization of ethylene was carried out in the same manner as described in Example 1 except that hydrogen was introduced in such an amount that the gauge pressure became 3.0 kg/cm$^2$.

After the polymerization was completed, the slurry containing a solid product was filtered and separated into a white powder and a liquid phase. The white powder thus obtained was dried at 80° C. for 10 hours under reduced pressure.

The dried white powder (ethylene polymer) was measured on various properties in the same Manner as described in Example 1. The results are shown in Table 1.

EXAMPLE 5

Polymerization

Into a 2-liter autoclave thoroughly purged with nitrogen was introduced 850 ml of purified hexane, and the autoclave was purged with ethylene at room temperature. Then, the temperature of the system was elevated to 60° C. To the autoclave were added 1.25 mmol of triethylaluminum, 0.025 mmol (in terms of titanium atom) of the solid titanium catalyst component (B-1) prepared in Example 1 and 150 ml of 4-methyl-1-pentene; and the autoclave was sealed. Thereafter, hydrogen was introduced into the autoclave until the pressure became 1.2 kg/cm$^2$. Then, ethylene was fed thereto so that the total pressure became 4 kg/cm$^2$, followed by continuously feeding ethylene to keep the same pressure for 2 hour.

After the polymerization was completed, the slurry was taken out of the autoclave at which the internal temperature of the autoclave is 55° C., and was rapidly filtered to separate the white powder produced by polymerization from the liquid phase.

The white powder was dried at 80° C. for 10 hours under reduced pressure. The dried white powder (ethylene polymer) was measured on various properties in the same manner as described in Example 1. The results are shown in Table 1.

COMPARATIVE EXAMPLE 1

Preparation of a Solid Catalyst Component (A-1)

95.2 g of anhydrous magnesium chloride, 442 ml of decane and 390.6 g of 2-ethylhexyl alcohol were heated at 130° C. for 2 hours to give a homogeneous solution. To the solution was added 21.3 g of phthalic anhydride, and they were stirred at 130° C. for 1 hour to dissolve the phthalic anhydride-in the homogeneous solution. Then, the total amount of 75 ml of the resulting homogeneous solution was dropwise added to 200 ml of titanium tetrachloride which was kept at −20° C. over a period of 1 hour. After the addition was completed, the temperature of the mixture was elevated to 110° C. over a period of 4 hours. When the temperature reached 110° C., 5.22 g of diisobutyl phthalate was added to the mixture, and they were kept at the same temperature for 2 hours with stirring. Then, the solid produced was collected by means of hot filtration, and the solid was resuspended in 275 ml of titanium tetrachloride, followed by heating at 110° C. for 2 hours. Thereafter, the solid is again collected by means of hot filtration, and the solid was thoroughly washed with decane of 110° C. and hexane of room temperature until any titanium compound liberated in the washing liquid was not detected. Through the above procedures, a solid titanium catalyst component (A-1) was prepared. This solid titanium catalyst component (A-1) had a composition comprising 2.4% by weight of titanium, 19.0% by weight of magnesium, 12.4% by weight of diisobutyl phthalate and 60% by weight of chlorine, and no 2-ethylhexoxy group was detected.

Polymerization

Into a catalyst bottle thoroughly purged with nitrogen: were introduced 20 ml of decane, 5 mmol of triethylaluminum and 0.1 mmol (in terms of titanium atom) of the solid titanium catalyst component (A-1), and they were stirred at room temperature for 5 minutes to obtain a decane slurry (C-1).

Into a 2 liter autoclave was introduced 1 liter of purified hexane in a nitrogen atmosphere. Then, the atmosphere in the autoclave was changed to an ethylene atmosphere, the temperature of the system was elevated to 60° C., and 4 ml (0.02 mmol in terms of titanium atom) of the decane slurry (C-1) was added to the autoclave.

Then, the temperature of the system was elevated up to 75° C., and hydrogen was introduced in such an amount that the gauge pressure became 1 kg/cm². Subsequently, ethylene was fed so that the gauge pressure became 8 kg/cm², followed by continuously feeding ethylene to keep the same pressure for 1 hour. During the feeding procedure, the temperature was kept at 80° C.

After the polymerization was completed, the slurry containing a solid product was filtered and separated into a white powder and a liquid phase. The white powder thus obtained was dried at 80° C. for 10 hours under reduced pressure.

The dried white powder (ethylene polymer) was measured on various properties in the same manner as described in Example 1. The results are shown in Table 1.

COMPARATIVE EXAMPLE 2

Preparation of a Solid Titanium Catalyst Component (A-2)

In 1 liter of decane was suspended 0.75 mol of anhydrous magnesium chloride. To the resulting suspension was added 2.25 mol of 2-ethylhexanol. The temperature of the system was elevated with stirring, and the mixture was heated at 120° C. for 2 hours to obtain a colorless transparent homogeneous solution. This solution remained colorless, transparent and homogeneous, though it was allowed to stand for cooling to room temperature.

In a 1-liter glass flask were introduced 400 ml of decane and 400 mmol (440 ml) of titanium tetrachloride in a nitrogen atmosphere, and they were cooled to 0° C. To the flask was dropwise added 100 mmol (in terms of magnesium atom) of the above-obtained colorless transparent homogeneous solution over a period of 20 minutes using a dropping funnel. As soon as the solution was dropwise added, bubbling started, and the resulting mixture turned into an yellow suspension. After the addition was completed, the temperature of the suspension was elevated at a rate of 4° C./min, and stirring of the suspension was continued at 80° C. for 1 hour. After the reaction, the solid produced was separated from the liquid phase using a glass filter in a nitrogen atmosphere, and the solid was washed with 2 liters of decane. The solid was resuspended in 900 ml of decane, and the resulting suspension was heated at 120° C. for 1 hour and 30 minutes. Through the above procedures, a solid titanium catalyst component (A-2) was obtained.

The solid titanium catalyst component (A-2) had a composition comprising 8.1% by weight of titanium, 55.0% by weight of chlorine, 17.0% by weight of magnesium and 0.04% by weight of 2-ethylhexoxy group.
Polymerization Into a 2 liter autoclave was introduced 1 liter of purified hexane in a nitrogen atmosphere, and the temperature of the system was elevated to 50° C. To the autoclave were added 1.0 mmol of triisobutylaluminum and 0.02 mmol (in terms of titanium atom) of the above-obtained solid titanium catalyst component (A-2), and the autoclave was sealed. Then, hydrogen was introduced in such an amount that the gauge pressure became 4 kg/cm². Subsequently, ethylene was fed so that the gauge pressure became 8 kg/cm², followed by continuously feeding ethylene to keep the same pressure for 2 hours. During the feeding procedure, the temperature was kept at 80° C.

After the polymerization was completed, the slurry containing a solid product was filtered and separated into a white powder and a liquid phase. The white powder thus obtained was dried at 80° C. for 10 hours under reduced pressure.

The dried white powder (ethylene polymer) was measured on various properties in the same manner as describerd in Example 1. The results are shown in Table 1.

COMPARATIVE EXAMPLE 3

Preparation of a Solid Titanium Catalyst Component (A-3)

19.1 g of magnesium chloride was suspended in 88.4 ml of decane. Then, 78.1 g of 2-ethylhexanol was added to the system. The temperature of the system was elevated up to 135° C.; and the mixture was stirred for 4 hours while keeping the temperature of the system at 135° C., to obtain a colorless transparent homogeneous solution. After the solution thus obtained was cooled to 100° C., 9.58 g of tetraethoxysilane was added thereto at 100° C., and they were stirred at 100° C. for 1 hour to obtain a magnesium chloride-containing decane solution. Into a 400-ml flask was introduced 200 ml of titanium tetrachloride, and the system was cooled to –20° C. Then, to the flask was dropwise added 50 ml of the above-obtained magnesium chloride-containing decane solution (concentration of magnesium chloride: 1 mol/liter) over a period of 2 hours. The system was slowly heated, and at 90° C. the resulting mixture was stirred for 2 hours, followed by hot filtration. The solid obtained was washed with decane of 90° C. and then thoroughly washed with decane of room temperature, to obtain a solid titanium catalyst component (A-3).

This solid titanium catalyst component (A-3) had a composition comprising 10.7% by weight of titanium, 57% by weight of chlorine, 12.0% by weight of magnesium and 8.4% by weight of 2-ethylhexoxy group.

Into a 500-ml flask was introduced 400 ml of decane. To the flask was added 3.59 g of the solid titanium catalyst component (A-3) and were further added 20 ml of a decane solution of an aluminum compound having an average composition of Al(O-i-$C_3H_7$)$Cl_2$ (Al concentration: 1 mol/liter) and 0.15 ml of isopropanol. The temperature of the system was elevated, and the resulting mixture was stirred at 150° C. for 3 hours. The solid produced was collected by hot filtration, washed with decane of 130° C., and then thoroughly washed with decane of room temperature to obtain a solid titanium catalyst component (A-4).

This solid titanium catalyst component (A-4) had a composition comprising 4.1% by weight of titanium, 11% by weight of magnesium, 49% by weight of chlorine and 12.9% by weight of aluminum and 0.2% by weight of isopropoxy group.
Polymerization Into a 2-liter autoclave was introduced 1 liter of purified hexane in a nitrogen atmosphere, and the temperature of the system was elevated up to 50° C. To the autoclave were added 1.0 mmol of triisobutylaluminum and 0.02 mmol (in terms of titanium atom) of the above-obtained solid titanium catalyst component (A-4), and the autoclave was sealed. Then, hydrogen was introduced in such an amount that the gauge pressure became 4 kg/cm². Subsequently, ethylene was fed so that the gauge pressure became 8 kg/cm², followed by continuously feeding ethylene to keep the same pressure for 2 hours. During the feeding procedure, the temperature was kept at 80° C.

After the polymerization was completed, the slurry containing a solid product was filtered and separated into a white powder and a liquid phase. The white powder thus obtained was dried at 80° C. for 10 hours under reduced pressure.

The dried white powder (ethylene polymer) was measured on various properties in the same manner as described in Example 1. The results are shown in Table 1.

COMPARATIVE EXAMPLE 4

Preparation of a Solid Catalyst Component (A-5)

A 3-liter autoclave was thoroughly purged with nitrogen. Into the autoclave were introduced 1.5 liters of purified kerosine, 75 g of anhydrous magnesium chloride, 109 g of ethanol and 10 g of Emasol 320 (sorbitan distearate, available from Kao Atlas Co., Ltd.). The temperature of the system was elevated with stirring, and the resulting mixture was stirred at 125° C. for 20 minutes at 600 rpm. The pressure in the system was made 10 kg/cm$^2$-G using nitrogen. Then, a cock of an SUS (stainless steel) tube (inner diameter: 3 mm) directly connected with the autoclave and warmed at 125° C. was opened, and the liquid in the autoclave was transferred into a 5-liter glass flask (equipped with a stirrer) in which 3 liters of purified kerosine cooled at −15° C. had been previously introduced. The amount of the liquid thus transferred was 1 liter, and the time required for the transference was about 20 seconds. The solid produced was collected by filtration and thoroughly washed with hexane.

To 12 g of the solid was added 200 ml of decane to give a slurry. The slurry was cooled to 0° C. and kept at the same temperature. To the slurry was dropwise added 125 mmol of diethylaluminum chloride over a period of 30 minutes. After the addition was completed, the slurry was kept at room temperature for 1 hour, then heated to 90° C., and kept at the same temperature for 3 hours. Through this operation, organoaluminum was partly fixed onto the magnesium chloride. The slurry was allowed to stand, and the supernatant liquid was removed. To the resulting material was added decane to give a slurry again. This operation was repeated twice.

Then, to the slurry was added 200 ml of decane, and the resulting slurry was kept at 0° C. with stirring, followed by dropwise adding thereto a mixture of 5 mmol of vanadyl trichloride diluted with 10 ml of decane and 5 mmol of titanium tetrachloride over a period of 15 minutes. After the addition was completed, the temperature of the system was elevated to 80° C., and the system was kept at the same temperature for 1 hour.

Then, the resulting solid product was collected by filtration and washed with decane until any vanadium and titanium liberated in the washing liquid were not detected, to obtain a solid catalyst component (A-5).

Polymerization

Into a 2-liter autoclave were introduced 1 liter of purified decane, 2.0 mmol of triisobutylaluminum and 0.01 mmol (in terms of the total metal atoms of titanium and vanadium) of the solid catalyst component (A-5). After the temperature of the system was set to 40° C., an ethylene gas was introduced so that the total pressure became 8 kg/cm$^2$-G, to perform polymerization for 1 minute (first stage). Then, the ethylene gas was released, and a hydrogen gas was introduced so that the pressure became 1 kg/cm$^2$-G.

Subsequently, the temperature of the system was elevated to 70° C., and an ethylene gas was again introduced so that the total pressure became 8 kg/cm$^2$-G, to restart the polymerization. Thereafter, ethylene was continuously fed so that the total pressure was kept at 8 kg/cm$^2$-G, and the polymerization was continued at 80° C. for 80 minutes.

After the polymerization was completed, the slurry containing a solid product was filtered and separated into a white powder and a liquid phase. The white powder thus obtained was dried at 80° C. for 10 hours under reduced pressure.

The dried white powder (ethylene polymer) was measured on various properties in the same manner as described in Example 1. The results are shown in Table 1.

COMPARATIVE EXAMPLE 5

Preparation of a Solid Titanium Catalyst Component (B-4)

Into a 200-ml four-necked flask was introduced 100 ml of hexane at room temperature (26° C.) while purging the flask with nitrogen. To the flask were added 3 mmol (in terms of aluminum atom) of triethylaluminum and 1 mmol (in terms of titanium atom) of the solid titanium composite (A) prepared in Example 1, followed by stirring at room temperature for 1 hour.

After the stirring was completed, the solid produced was separated from the liquid by means of decantation. To the solid was added hexane, and they were stirred. Then, a washing operation to remove the supernatant liquid through decantation was repeated three times, to obtain a solid titanium catalyst component (B-4).

Polymerization

Polymerization of ethylene was carried out in the same manner as described in Example 1 except that the solid titanium catalyst component (B-4) was used in place of the solid titanium catalyst component (B-1).

After the polymerization was completed, the slurry containing a solid product was filtered and separated into a white powder and a liquid phase. The white powder thus obtained was dried at 80° C. for 10 hours under reduced pressure.

The dried white powder (ethylene polymer) was measured on various properties in the same manner as described in Example 1. The results are shown in Table 1.

COMPARATIVE EXAMPLE 6

Preparation of a Solid Titanium Composite (A-6)

Into a 400-ml four-necked flask thoroughly purged with nitrogen were introduced 5 g (52.5 mmol) of anhydrous magnestium chloride and 190 ml of purified decane.

To the flask was dropwise added 18.4 ml (315 mmol) of ethanol through a dropping funnel at room temperature (26° C.) over a period of 45 minutes with stirring. After the addition was completed, the resulting mixture was stirred at room temperature for 1 hour.

Then, to the mixture was dropwise added 17.2 ml (137 mmol) of diethylaluminum chloride over a period of 1 hour while controlling the temperature of the system in the range of 35 to 40° C. After the addition was completed, the resulting mixture was stirred at room temperature for 1 hour.

Subsequently, 69.2 ml (630 mmol) of titanium tetrachloride was added to the mixture and they were stirred at 80° C. for 2 hours. The reaction product was subjected to hot filtration using a glass filter equipped with a jacket to separate the solid from the liquid phase. The solid was washed with 600 ml of purified decane.

Through the above procedures, a solid titanium composite (A-6) was obtained. This solid titanium composite (A-6) had a composition comprising 4.8% by weight of titanium, 2.2% by weight of aluminum, 15.0% by weight of magnesium, 56.0% by weight of chlorine and 8.8% by weight of ethoxy group.

Preparation of a Solid Titanium Catalyst Component (B-5)

Into a 200-ml four-necked flask was introduced 100 ml of hexane at room temperature (26° C.) while purging the flask with nitrogen. To the flask were added 3 mmol (in terms of aluminum atom) of triethylaluminum and 1 mmol (in terms of titanium atom) of the above-obtained solid titanium composite (A-6), followed by stirring at room temperature for 1 hour. After the stirring was completed, the solid produced was separated from the liquid by means of decantation. To the solid was added hexane, and they were stirred. Then, a washing operation to remove the supernatant liquid through decantation was repeated three times.

The resulting material was resuspended in 100 ml of hexane, and 58.4 ml of dry air containing 11.2 Nml of oxygen was introduced into the gas phase zone, followed by stirring at room temperature for 1 hour. During the stirring, the volume decrease of the gas phase zone was measured using a gas burette. As a-result, the volume decrease was 10.1 ml, and the amount of oxygen absorption was 9.2 Nml.

After the stirring was completed, the solid produced was separated from the liquid by means of decantation. To the solid was added hexane, and they were stirred. Then, a washing operation to remove the supernatant liquid through decantation was repeated twice, to obtain a solid titanium catalyst component (B-5).

Polymerization

Polymerization of ethylene was carried out in the same manner as described in Example 1 except that 0.02 mmol (in the term of titanium atom) of the solid titanium catalyst component (B-5) was introduced in place of 0.01 mmol (in the term of titanium atom) of the solid titanium catalyst component (B-1).

After the polymerization was completed, the slurry containing a solid product was filtered and separated into a white powder and a liquid phase. The white powder thus obtained was dried at 80° C. for 10 hours under reduced pressure.

The dried white powder (ethylene polymer) was measured on various properties in the same manner as described in Example 1. The results are shown in Table 1.

as would be obvious to one skilled in the art are intended to be included within the scope of the following claims.

What is claimed is:

1. An ethylene polymer having the following properties:
   (i) a density in the range of from 0.90 to 0.98 g/cm$^3$,
   (ii) a melt flow rate, as measured at 190° C. under a load of 2.16 kg, in the range of 0.001 to 3,000 g/10 min,
   (iii) a melt tension (MT) and melt flow rate (MFR) which satisfy the relationship represented by the formula:

log MT ≧ −0.41 log MFR+0.75, (iv) a molecular weight distribution Mw/Mn in the range of 2 to 9,
   (v) a molecular weight distribution Mz/Mw in the range of 2 to 5,
   (vi) a g* value, which is an index of a proportion of long-chain branches, in the range of 0.95 to 1.00, and
   (vii) a swell ratio of from 1.35 to 1.50.

2. The ethylene polymer as in claim 1, prepared by a process comprising polymerizinc ethylene in the presence of an ethylene polymerization catalyst comprising:
   (I) a solid titanium catalyst component obtained by the contact of oxygen with a solid titanium organometallic compound complex which is obtained by the contact with each other of
      (A) a solid titanium composite which is obtained by the contact with each other of
         (a) a solid magnesium aluminum composite containing magnesium, halogen and aluminum, and an alkoxy group having 6 or more carbon atoms and/or alcohol having 6 or more carbon atoms, said solid magnesium aluminum composite (a) being obtained by the contact with each other of
            (a-1) a magnesium solution formed from a halogen-containing magnesium compound, alcohol having 6 ore more carbon atoms and a hydrocarbon solvent, and
            (a-2) an organoaluminum compound, and
         (b) a tetravalent titanium compound,
      wherein the titanium in said solid titanium composite (A) has a valence of 4, and a molar ratio of the alkoxy group

TABLE 1

| | Yield (g) | Catalytic Activity *1 | MFR g/10 min. | MT g | α *2 | SR | Mw/Mn | Mz/Mn | g* | Density g/cm$^3$ |
|---|---|---|---|---|---|---|---|---|---|---|
| Ex.1 | 149.2 | 14900 | 0.07 | 18.5 | 0.81 | 1.43 | 5.18 | 3.61 | 1.00 | 0.96 |
| Ex.2 | 159.1 | 15900 | 0.09 | 20.5 | 0.89 | 1.42 | 5.68 | 3.97 | 1.00 | 0.97 |
| Ex.3 | 157.0 | 15700 | 0.09 | 16.0 | 0.79 | 1.43 | 5.38 | 4.15 | 0.99 | 0.97 |
| Ex.4 | 102.9 | 10300 | 2.15 | 4.9 | 0.82 | 1.43 | 6.70 | 4.04 | 0.98 | 0.96 |
| Ex.5 | 83.3 | 8200 | 1.10 | 5.7 | 0.77 | 1.40 | 5.95 | 4.20 | 0.98 | 0.93 |
| Comp. Ex.1 | 207.9 | 10400 | 0.04 | 15.5 | 0.62 | 1.20 | 5.22 | 3.18 | 1.00 | 0.95 |
| Comp Ex.2 | 184.2 | 9200 | 0.75 | 12.0 | 1.03 | 1.43 | 10.30 | 6.44 | 1.00 | 0.96 |
| Comp Ex.3 | 189.7 | 9500 | 0.21 | 30.0 | 1.21 | *3 | 13.87 | 7.96 | 0.99 | 0.96 |
| Comp Ex.4 | 343.7 | 34400 | 0.19 | 18.2 | 0.97 | 1.34 | 9.86 | 6.37 | 1.00 | 0.97 |
| Comp Ex.5 | 353.4 | 35300 | 0.08 | 12.3 | 0.65 | 1.27 | 7.09 | 3.81 | 1.00 | 0.96 |
| Comp Ex.6 | 378.2 | 18900 | 0.07 | 14.5 | 0.70 | 1.29 | 5.70 | 3.75 | 0.99 | 0.97 |

*1: g-PE/mmol-Ti
*2: α = log MT + 0.4 × log MFR
*3: unmeasurable (occurrence of melt fracture)

As is apparent from the results shown in Table 1, the ethylene polymer of the invention has the aforementioned properties (i) to (vii). That is, the ethylene polymer has a high density, a specific relationship between the melt tension and the melt flow rate, a high swell ratio, a narrow molecular weight distribution (Mw/Mn, Mz/Mw) and a g* value which is close to 1. Therefore, such an ethylene polymer is excellent in moldability, and a molded article obtained therefrom is excellent in mechanical strength such as rigidity and impact strength, and almost free from poor appearance.

The present invention being thus described, it will be obvious that the same may be varied in many ways. Such variations are not to be regarded as a departure from the spirit and scope of the invention, and all such modifications having 6 or more carbon atoms and/or alcohol having 6 or more carbon atoms to the titanium is in the range of 0.26 to 6.0, and and
(B) an organometallic compound containing a metal selected from Group I to Group III of the periodic table; and
(II) an organometallic compound catalyst component containing a metal selected from Group I to Group III of the periodic table.

3. The ethylene polymer as in claim 1, wherein the ethylene polymer is a homopolymer of ethylene, a random copolymer of ethylene and an olefin, or a block copolymer of ethylene and an olefin.

4. The ethylene polymer as in claim 1, wherein in (iv) the molecular weight distribution Mw/Mn is in the range of 2 to 7.

* * * * *